United States Patent [19]

Althaus

[11] Patent Number: 5,647,200
[45] Date of Patent: Jul. 15, 1997

[54] HEAT GENERATOR

[75] Inventor: Rolf Althaus, Flawil, Switzerland

[73] Assignee: Asea Brown Boveri AG, Baden, Switzerland

[21] Appl. No.: 225,396

[22] Filed: Apr. 8, 1994

[30] Foreign Application Priority Data

Apr. 8, 1993 [CH] Switzerland ............... 01 081/93

[51] Int. Cl.$^6$ .................................................. F02C 3/14
[52] U.S. Cl. ............................ 60/39.17; 60/737; 60/748
[58] Field of Search ............................... 60/39.17, 748, 60/261, 737, 738, 749; 415/DIG. 1

[56] References Cited

U.S. PATENT DOCUMENTS

| 2,605,610 | 8/1952 | Hermitte et al. ........... 60/39.17 |
| 2,607,191 | 8/1952 | Lee . | |
| 3,682,390 | 8/1972 | Cheshire et al. .............. 60/748 |
| 3,747,345 | 7/1973 | Markowski . | |
| 4,298,089 | 11/1981 | Birch et al. . | |
| 5,251,447 | 10/1993 | Joshi et al. ..................... 60/748 |
| 5,267,851 | 12/1993 | Washam et al. ............... 60/748 |

FOREIGN PATENT DOCUMENTS

| 0295353A1 | 9/1987 | European Pat. Off. . |
| 0315486A3 | 1/1990 | European Pat. Off. . |
| 719061 | 11/1954 | United Kingdom . |
| 1069033 | 5/1967 | United Kingdom . |

*Primary Examiner*—Louis J. Casaregola
*Attorney, Agent, or Firm*—Burns, Doane, Swecker & Mathis, L.L.P.

[57] ABSTRACT

The annular chamber of a heat generator for generating of hot gas, which is placed downstream of a fluid flow engine and upstream of a turbine, is defined by an exterior wall and an interior wall which extend approximately axially. The exterior wall and the interior wall are connected with each other by a plurality of supports extending radially. These supports have in their interior at least one supply conduit for a fuel and at least one further conduit for conveying an air flow. Furthermore, the supports also have a plurality of fuel nozzles, through which the fuel/air mixture is introduced into the annular chamber.

6 Claims, 2 Drawing Sheets

HEAT GENERATOR

FIELD OF THE INVENTION

The invention relates to a heat generator for generating heating gas, which is placed downstream of a fluid flow engine and upstream of a turbine.

BACKGROUND OF THE INVENTION

Heat generators in gas turbine sets are known, which operate downstream of a high-pressure turbine and upstream of a low-pressure turbine and are used to accomplish an intermediate super-heating of the exhaust gases from the high-pressure turbine in such a way that hot gas can be admitted to the low-pressure turbine.

These heat generators of the known type have a plurality of individual combustion chambers which are placed between the said turbines. A collector is provided between these combustion chambers and the high-pressure turbine, from which the exhaust gases are conducted to the heat generator via lines. A distributor is provided downstream of said combustion chamber, from which the heating gases flow to the low-pressure turbine.

A heat generator of this type is a relatively complicated component with a design which is disadvantageous in regard to flow. The individual combustion chambers, along with their respective complete infrastructure, such as fuel supply, air supply, burner, mixture formation, ignition, devices to prevent flashback, etc., naturally make the heat generator much more expensive.

OBJECT AND SUMMARY OF THE INVENTION

The invention is intended to provide relief here. The object of the invention as characterized in the claims is to maximize efficiency of a heat generator of the previously mentioned type and to reduce the discharge of noxious matter to a minimum.

The essential advantage of the invention lies in that the annular design can be integrated seamlessly between the high-pressure turbine and the low-pressure turbine, so that the inflow and outflow conditions of this heat generator are at an optimum.

A further advantage of the invention lies in that the heat generator itself constitutes a single combustion chamber, which reduces its infrastructure, so combustion with minimized noxious matter emissions can be performed in a controlled manner.

A further and essential advantage of the invention lies in that such a heat generator can be operated in accordance with the principle of self-ignition, i.e. such a heat generator is predestined to maintain the heating gas generation operation by injecting fuel into the hot exhaust gases from the high-pressure turbine.

Advantageous and practical further embodiments of the attainment of the object of the invention are characterized in the further dependent claims.

Exemplary embodiments of the invention will be described in detail below by means of the drawings. All elements not required for directly comprehending the invention have been omitted. In the several drawing figures like elements are provided with the same reference numerals. The direction of flow of the media is indicated by arrows.

DETAILED DESCRIPTION OF PREFERRED EMBODIMENTS

Figure 1:
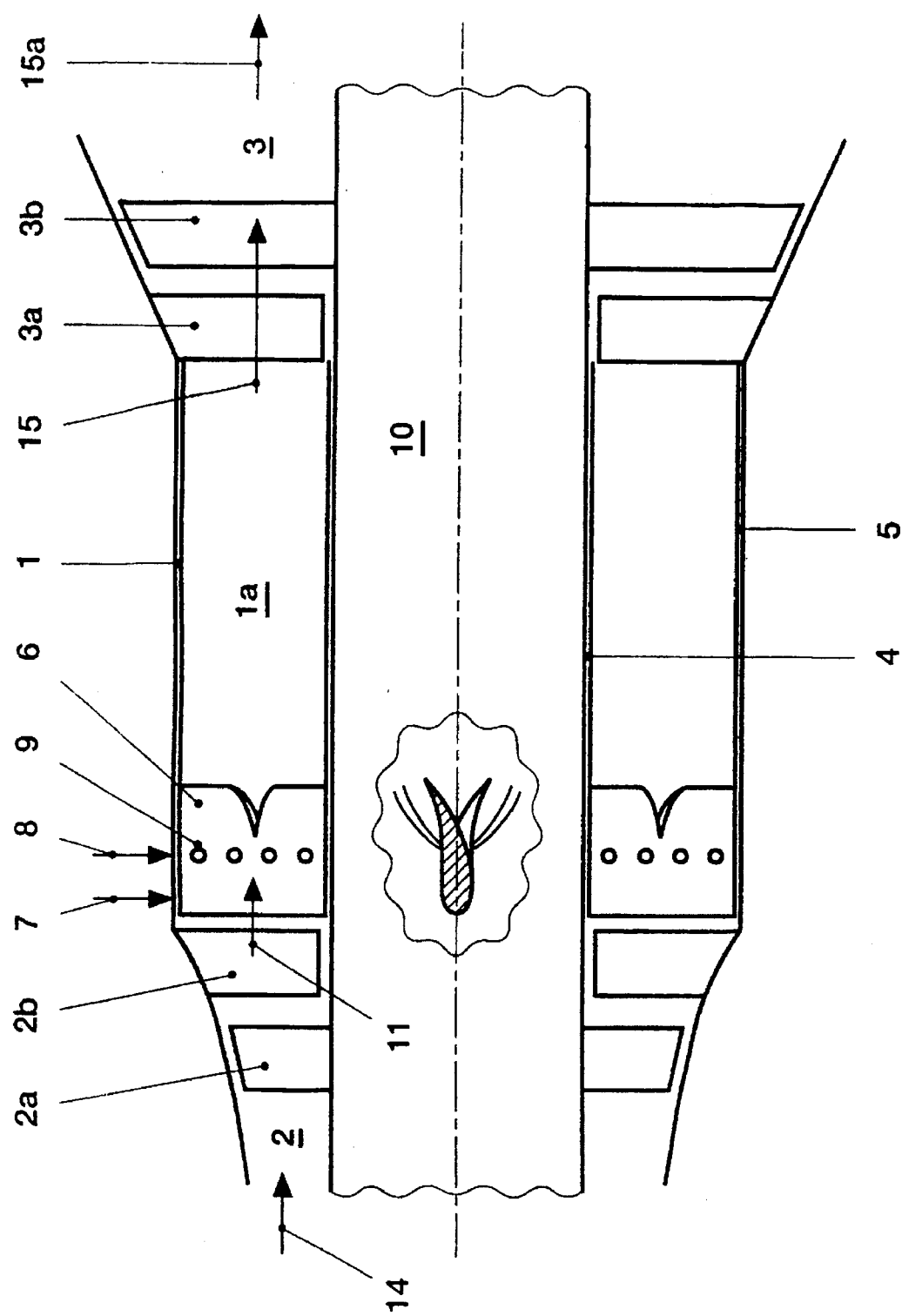
FIG. 1 is a schematic cross section of a heat generator located between a high-pressure turbine and a low-pressure turbine.

FIG. 1 shows a heat generator 1, placed between an upstream high-pressure turbine 2 with rotor vanes 2a at the end and guide vanes 2b, and a downstream low-pressure turbine 3 with guide vanes 3a at the front and subsequent rotor vanes 3b, all connected via a single rotor 10. It is of course possible to place such a heat generator 1 between, for example, a compressor and a low-pressure turbine, or it can also be used as a heat generator of an atmospheric furnace installation. The heat generator 1 has a cylindrical or quasi-cylindrical interior wall 4 and a cylindrical or quasi-cylindrical exterior wall 5, which define the heat generator as a combustion chamber. When the interior wall 4 and the exterior wall 5 follow cylindrical lines, the heat generator takes on an annular embodiment. The quasi-cylindrical line direction selection of the walls is meant to indicate a configuration, wherein the flow cross section of the heat generator 1 increases or decreases in the direction of flow. The interior wall 4 is connected with the exterior wall 5 via a plurality of radially placed supports 6. In FIG. 1 two of these supports 6 are shown in a front view and one in section. The interior wall 4 and the exterior wall 5 are constructed in the conventional manner, for example double-walled, by means of which it is possible to provide a controlled cooling of the parts stressed by heat. The supports 6, which are evenly distributed at the circumference, fulfill several functions which have the most intimate connection with the type of operation of the heat generator 1. Assuming that the heat generator 1 is operated with self-ignition, the support 6 illustrated here assumes several important functions. First, and as already mentioned above, the interior wall 4 is supported by the supports 6. A further function relates to the fuel supply 8, which radially flows into the individual supports 6 and from there is directly injected into the combustion chamber 1a of the heat generator 1 via a plurality of injection or inflow jets 9, as will be explained in detail below. Furthermore, the supports 6 are used for the air supply 7, which air is used as cooling air and/or mixture-forming air for the fuel 8 used. For technical flow reasons the supports 6 are designed as guide vanes, at least on the inflow side. The caloric disposition of the heating gases, assuming a self-ignition operation of the heat generator 1, is such that the heating gases 14 which are admitted to the high-pressure turbine 2 are expanded there only enough so that on the downstream side of this turbine 2 these gases still have a minimal temperature which allows self-ignition in the heat generator 1 together with the fuel 8 employed there. If, for example, natural gas is used as fuel 8, the combustion air 11 constituted by the exhaust gas must have a temperature on the order of 1000° C. at the downstream side of the high-pressure turbine 2 in the area of injection of the said fuel, if self-ignition is to be sustained in a stable manner. With arrangements of this type it is necessary to take precautions that the flame front from the combustion chamber 1a of the heat generator 1 cannot migrate upstream, i.e. flash-back of the flame in the direction toward the high-pressure turbine 2 must be prevented. It would be disadvantageous here to provide any flame traps downstream of the high-pressure turbine 2. Considering what has already been pointed out, the support herein proposed therefore assumes the function of a vortex generator by means of a special design, which is able to form a stable back-flow zone. The design of the support 6 which is practical for such a purpose will be explained in detail in connection with FIG. 2. The heating gases 15 made available in the heat generator 1 are admitted to the low-pressure turbine 3 and flow off for further caloric use, for example as carrier media of a downstream steam circuit.

Figure 2:
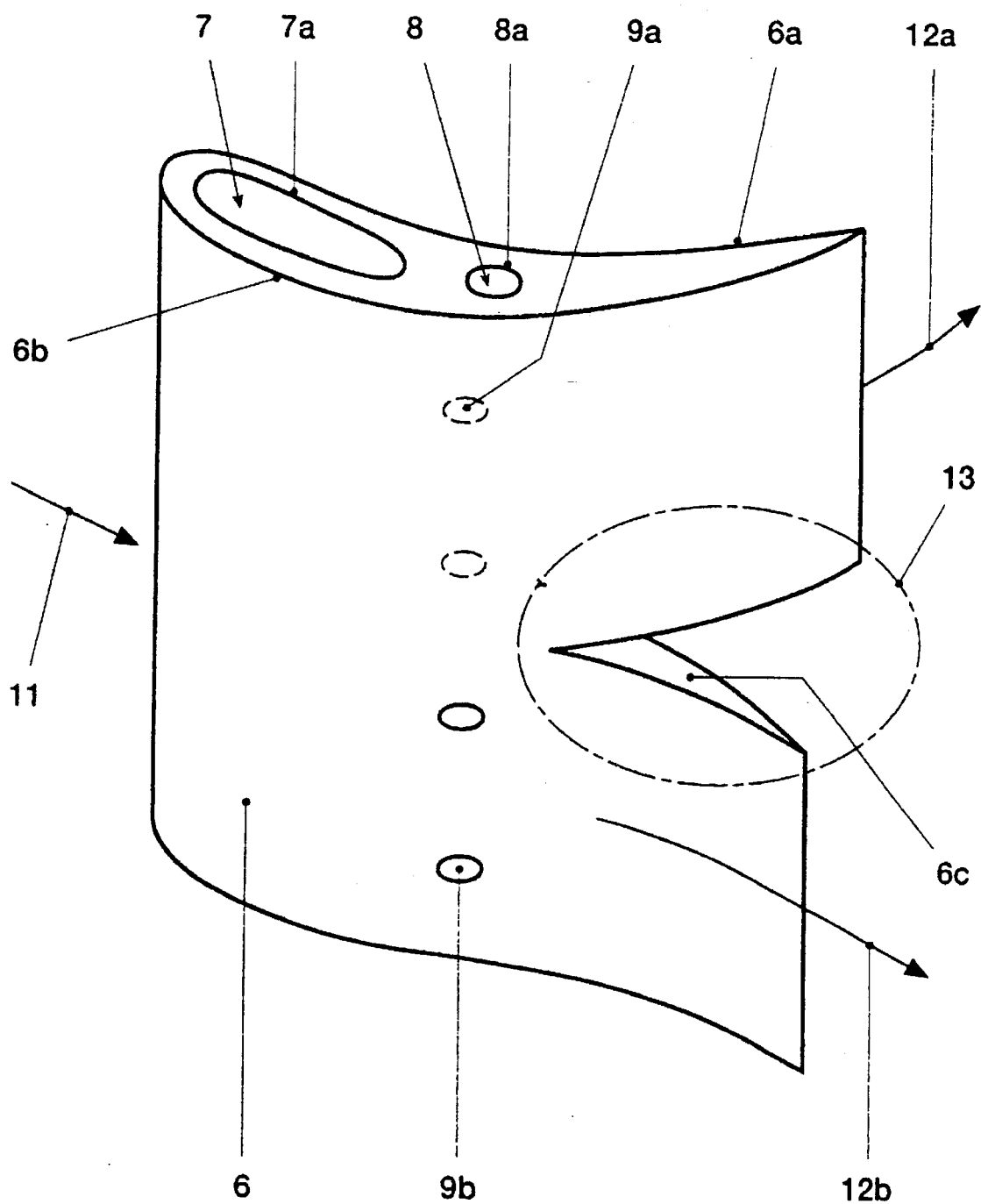
FIG. 2 illustrates a support in the form of a radial connection between the interior wall and the exterior wall of the heat generator.

FIG. 2 shows the support 6 in a perspective view. Intrinsically, the support 6 has the shape of a guide vane. In the place where the combustion air 11 flows in, the support 6 has an interior conduit 7a, through which the air 7, described in connection with FIG. 1 flows. A further conduit 8a is disposed along a plane at approximately the center of the flow, through which the fuel 8 flows. The support 6 in the form of a guide vane is divided by a notch 13, which divides the support into two diverging portions. In the direction of flow this includes approximately the rear half of the guide vane in such a way that the upper half of the guide vane has an uninterrupted profiling of the underpressure surface 6a and the overpressure surface 6b, while the lower rear half of the guide-vane-shaped support 6 is offset in relation to this, i.e. the profile of the overpressure surface 6b makes a transition into the underpressure surface 6c. The flow 11 impacting on the support 6 is split at the beginning of the offset notch 13 into two diverging partial flows 12a, 12b. Fuel nozzles 9a, 9b, shown here by means of openings, act in the area of the beginning notch 13. The fuel 8 supplied through the conduit 8a and, if required, mixed with or supported by air, flows through these fuel nozzles into the combustion chamber 1a of the heat generator 1 and there triggers self-ignition by means of the hot combustion air 11. The fuel nozzles 9a, 9b are evenly distributed within the radial extent of the support 6, either on both sides of the support 6 or only on the respective underpressure sides 6a, 6c, as can be seen in FIG. 2. The vortices generated in the flow direction by the diverging portions of the support not only accelerate the mixture of fuel 8 and combustion air 11 in the near area of the support, which triggers a short mixing length and accordingly direct self-ignition, but in the remote area, i.e. in the further combustion chamber 1a of the heat generator 1, they also additionally smooth out the concentration and temperature differences which are responsible for an increase in noxious matter emissions. Viewing this from the point of efficiency it can be said that the said compensation operates with minimal pressure losses, which results in an increased output of the downstream turbine. It is of course also possible to provide intermittent underpressure surfaces, i.e. a plurality of notches 13, over the height of the support 6 in connection with a desired vortex generation.

It is of course possible to lay out the notch 13 in such a way that it includes the entire axial length of the support 6, i.e., the divergence between the overpressure and underpressure surfaces includes the entire support 6 and divides it into two planes.

What is claimed is:

1. A heat generator for generating heated combustion gas which is placed downstream of a fluid flow engine and upstream of a turbine, comprising:

an annular chamber defined by an exterior wall and an interior wall;

a plurality of radially extending supports connected to the exterior wall and the interior wall;

at least one supply conduit for a fuel provided in each support;

a plurality of fuel nozzles arranged in each support to inject fuel into the chamber from the supply conduit; and each support being divided at a downstream end by at least one notch, the support diverging at the notch in opposite directions to form at least two oppositely directed vortex-generating underpressure surfaces.

2. A heat generator in accordance with claim 1, wherein the support has a vane-shaped profile.

3. A heat generator in accordance with claim 1, wherein each support has at least one air-conducting conduit.

4. A heat generator in accordance with claim 1, wherein at least one fuel nozzle is positioned on each of the underpressure surfaces.

5. A heat generator in accordance with claim 2, wherein at least one fuel nozzle is positioned on each of the underpressure surfaces.

6. A heat generator in accordance with claim 2, wherein, an underpressure surface of an upstream portion of the vane shaped support continues into an upper portion of the support at the notch, and the underpressure surface of the upstream portion changes to an overpressure surface on a bottom portion of the support at the notch.

* * * * *